UNITED STATES PATENT OFFICE.

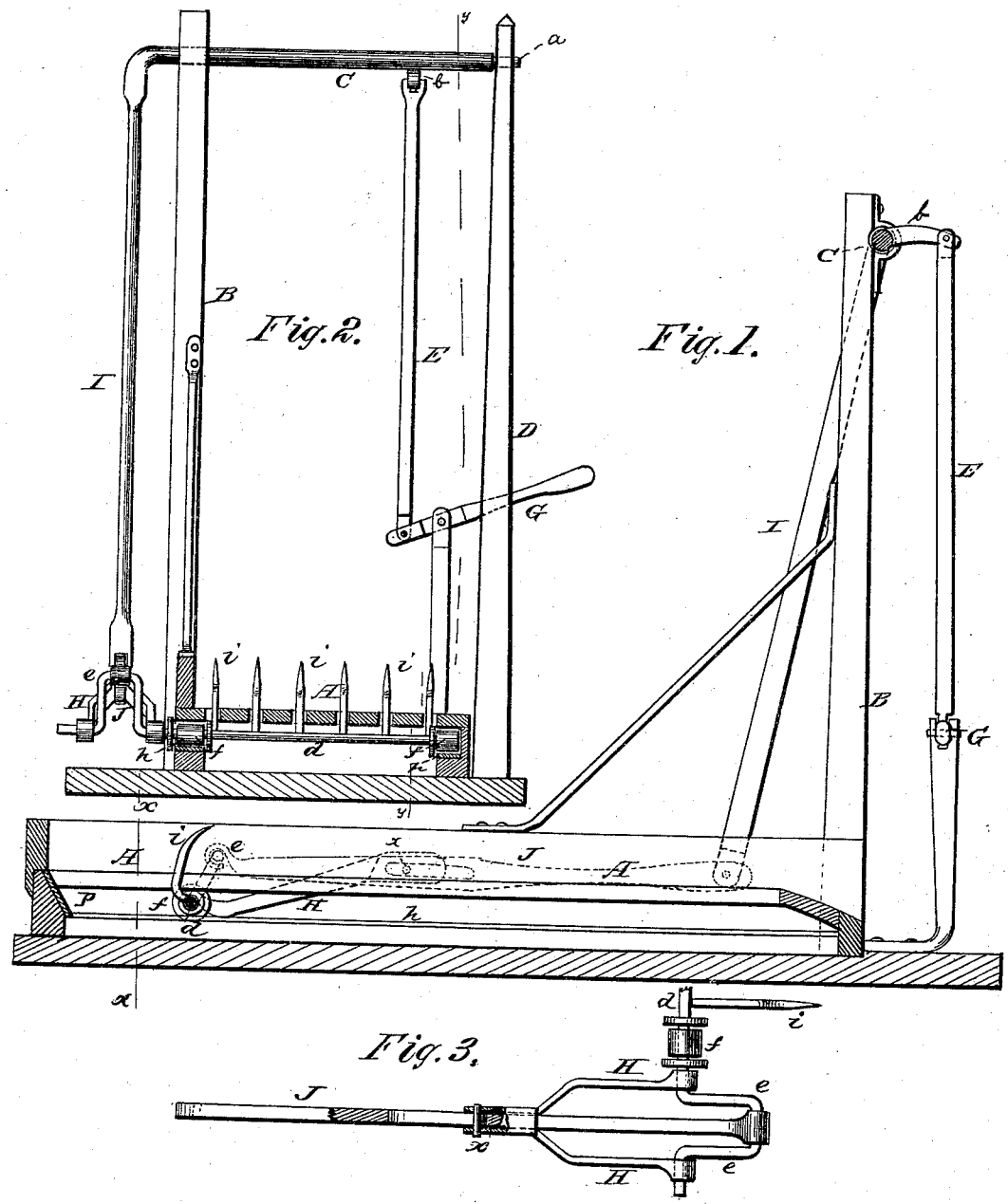

DANIEL H. KIME, OF KENDALLVILLE, INDIANA, ASSIGNOR OF ONE-THIRD HIS RIGHT TO FREDERICK J. VOSS, OF SAME PLACE.

IMPROVEMENT IN RAKE ATTACHMENTS FOR HARVESTERS.

Specification forming part of Letters Patent No. 178,160, dated May 30, 1876; application filed April 4, 1876.

*To all whom it may concern:*

Be it known that I, DANIEL H. KIME, of Kendallville, in the county of Noble, and State of Indiana, have invented certain new and useful Improvements in Rake Attachment for Harvesters; and I do hereby declare that the following is a full, clear, and exact description thereof, which will enable others skilled in the art to which it appertains to make and use the same, reference being had to the accompanying drawings, and to the letters of reference marked thereon, which form a part of this specification:

The nature of my invention consists in the construction and arrangement of a rake attachment for harvesters, as will be hereinafter more fully set forth.

In the annexed drawing, Figure 1 is a central vertical section on line $y\ y$, Fig. 2. Fig. 2 is a tranverse section on line $x\ x$, Fig. 1; and Fig. 3 is detail view of operating device.

A represents an ordinary slat platform for harvesters, and B represents the usual reel-post. In the upper end of the reel-post B is placed the front end of a rocking-shaft, C, which passes through a box or bearing, $a$, secured to a post, D, secured to the inner rear corner of the platform. The rocking-shaft C is provided with an arm, $b$, connected by a rod, E, with a lever, G, so arranged on the platform of the machine that the driver can operate the same either by hand or foot, as desired.

From the rear end of the shaft C depends an arm, I, secured to or formed with it so as to swing back and forth with the rocking of said shaft. The lower end of the arm I is by a bar, J, connected with a crank, $e$, formed on a shaft, $d$, which passes under the platform A, and has two flanged rollers or wheels, $f\ f$, thereon to run on guides or ways $h\ h$, at the front and rear of the platform. On the shaft $d$ are secured a series of curved teeth, $i\ i$, to pass up between the slats of the platform. The connecting-bar J passes through the center of a stirrup, H, the ends of which are placed on each side of the crank $e$ on the shaft $d$. The bar J is slotted longitudinally where it passes through the stirrup, and a pin, $x$, in said stirrup passes through the slot in the bar.

The rake is moved back and forth the entire length of the platform by the working of the lever G. As the rake starts from the outer end of the platform the teeth project upward and the bar J holds the teeth in that position to rake off the hay or grain while the rake moves to the inner end of the platform. As the motion of the lever G is now reversed, the bar J first slides in the stirrup to turn the shaft and lower the teeth below the platform, in which position the rake is then moved back to the outer end of the platform, and as they reach this end the teeth strike an incline, $p$, and are turned up again.

Having thus fully described my invention, what I claim, and desire to secure by Letters Patent, is—

1. The combination of the rake $d\ i$ with crank $e$, the stirrup H, connecting-bar J, arm I, and rocking-shaft C, operated by means of the lever G, substantially as and for the purposes herein set forth.

2. The rake $d\ i$, crank $e$, stirrup H, bar J, arm I, and rock-shaft C, in combination with the flanged wheels $f\ f$, and incline $p$, substantially as and for the purpose specified.

In testimony that I claim the foregoing as my own I affix my signature in presence of two witnesses.

DANIEL H. KIME.

Witnesses:
FRED J. VOSS,
JAMES H. WILLIAMS.